C. R. MEEKER.
COOKING UTENSIL.
APPLICATION FILED FEB. 23, 1915.

1,192,088. Patented July 25, 1916.

Witnesses:
C. E. Wessels.
A. A. Olson.

Inventor:
Claude R. Meeker,
By Joshua R. H. Potts
his Attorney

UNITED STATES PATENT OFFICE.

CLAUDE R. MEEKER, OF CHICAGO, ILLINOIS.

COOKING UTENSIL.

1,192,088. Specification of Letters Patent. Patented July 25, 1916.

Application filed February 23, 1915. Serial No. 10,006.

*To all whom it may concern:*

Be it known that I, CLAUDE R. MEEKER, a citizen of the United States, and a resident of the city of Chicago, county of Cook, and State of Illinois, have invented certain new and useful Improvements in Cooking Utensils, of which the following is a specification.

My invention relates to cooking utensils and more specifically to a device designed for use especially in the boiling or steaming of fruit and vegetables arranged in jars or cans.

The object of my invention is the production of a device as mentioned which will be of simple construction and efficient in use.

Other objects will appear hereinafter.

The invention consists in the combinations and arrangements of parts hereinafter described and claimed.

The invention will be best understood by reference to the accompanying drawing forming a part of this specification, and in which—

Figure 1:
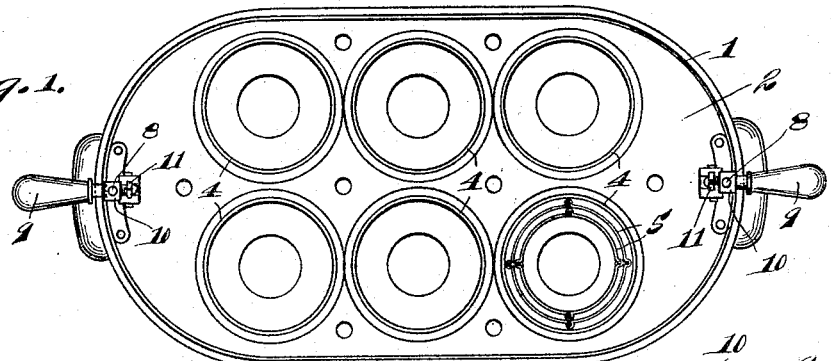
Figure 2:
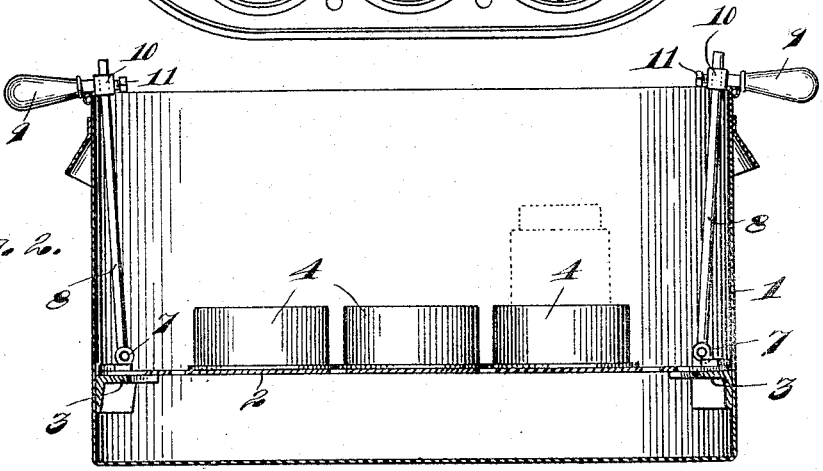
Figure 4:
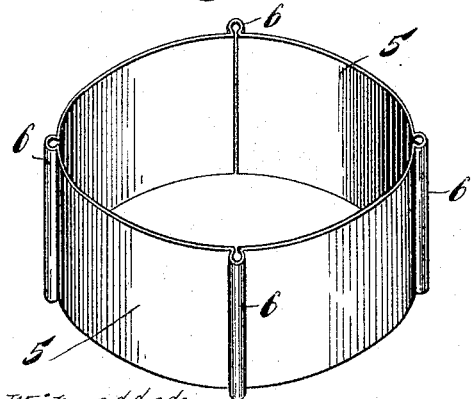
Figure 3:
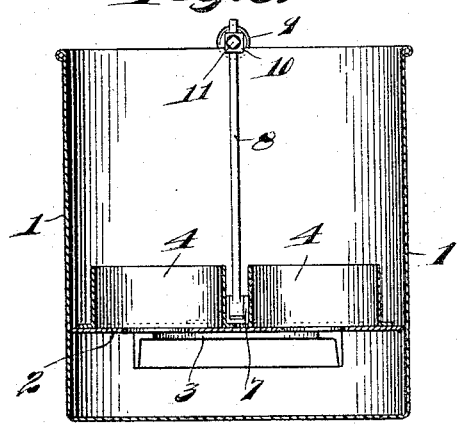

Figure 1 is a top plan view of a cooking utensil embodying my invention, Fig. 2 is a central vertical longitudinal section thereof, Fig. 3 is a vertical transverse section of the device, and Fig. 4 is an enlarged perspective view of one of the rings adapted for insertion into the jar sockets in order to adapt said sockets to accommodate smaller jars.

The preferred form of construction as illustrated in the drawing comprises a container 1 having comparatively high sides. Removably arranged in said container is a jar holder consisting of a flat perforated plate 2 which is of a peripheral form to snugly fit container 1 as shown. Provided upon the lateral walls of container 1 at the ends of the latter are inwardly projecting flanges 3 adapted for engagement with the ends of plate 2 in order to loosely support the latter in said container above the bottom thereof. Provided upon the upper side of plate 2 are circular sockets 4 adapted for the reception of fruit jars as will be readily understood. The sockets 4 will be of a diameter adapting the same to accommodate fruit jars of a certain size and in order to adapt the device to accommodate jars of a smaller size, rings 5 are provided which are adapted for insertion into said sockets as clearly shown in Fig. 1. The rings 5 are of less diameter than said sockets and hence are adapted to accommodate jars of less diameter. In order to hold said rings 5 centrally in said sockets, each of said rings is formed with outwardly projecting longitudinally extending beads 6. Any number of rings 5 of graduated sizes may of course be employed in order to widen the range of jars adapted to be accommodated by the device.

Pivotally secured at 7 to the ends of plate 2 are arms 8 adapted, when the device is in use, to extend upwardly from said plate along the inner walls of container 1 as clearly shown in Fig. 2. Provided at the upper ends of arms 8 are handle pieces 9 provided at their inner ends with slotted shanks 10 which slidably engage with said arms. Set screws 11 threaded in the portions 10 provide means of locking hand pieces 9 in positions of longitudinal adjustment upon arms 8 as will be readily understood.

With the construction set forth it will be seen that the handle pieces 9 project exteriorly so as to permit of ready engagement in the handling of the jar holder, facilitating ready insertion thereof into container 1 or removal thereof from said container. By reason of the adjustable connection between the hand pieces 9 and arms 8, if it is desired to support the jar holder higher in the container 1 it is only necessary to adjust said handle pieces farther down upon arms 8, in which event said handle pieces will engage against the upper edge of said container and serve to suspend the plate 2 in the position desired.

By supporting the fruit jars above the bottom of container 1, the same are removed from the zone of intense heat, during the boiling or steaming operation, resulting in a uniform heating of said jars and therefore in the prevention of cracking of the same as otherwise results.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the class described comprising a container open at its upper side; a jar holder loosely mounted in said container; inwardly projecting portions on the lateral walls of said container for supporting said holder above the bottom of said container; elongated members arising from opposite sides of said holder; and exteriorly projecting handle pieces mounted on said members for longitudinal adjustment; and means for locking said handle pieces in positions of longitudinal adjustment on said members, substantially as described.

2. A device of the class described comprising a container open at its upper side; a jar holder loosely mounted in said container; inwardly projecting portions on the lateral walls of said container for supporting said holder above the bottom of said container; elongated members arising from opposite sides of said holder; exteriorly projecting handle pieces mounted on said members for longitudinal adjustment; and set screws for locking said handle pieces in positions of longitudinal adjustment on said members, substantially as described.

3. A device of the class described comprising a container open at its upper side; a jar holder loosely mounted in said container, said holder comprising a horizontally disposed plate; jar sockets provided upon the upper side of said plate; members of less diameter than said sockets adapted for insertion in the latter to adapt said sockets to accommodate jars of less diameter; and exterior projections on said rings for engagement against the inner surfaces of said sockets, substantially as described.

4. A device of the class described comprising a container open at its upper side; a jar holder loosely mounted in said container, said holder comprising a horizontally disposed plate; circular jar sockets provided at the upper side of said plate; rings of less diameter than said sockets adapted for insertion in the latter to adapt said sockets to accommodate jars of less diameter; and exterior beads on said rings for engagement against the inner surfaces of said sockets, substantially as described.

In testimony whereof I have signed my name to this specification in the presence of two subscribing witnesses.

CLAUDE R. MEEKER.

Witnesses:
JOSHUA R. H. POTTS,
HELEN F. LILLIS.

Copies of this patent may be obtained for five cents each, by addressing the "Commissioner of Patents, Washington, D. C."